(12) United States Patent
Novotny et al.

(10) Patent No.: US 9,753,990 B2
(45) Date of Patent: Sep. 5, 2017

(54) BUILDING USER TRUST IN PROFILE CREATION AND RECOMMENDATIONS BASED ON MANAGED INTERACTION WITH USER

(71) Applicant: Microsoft Corporation, Redmond, WA (US)

(72) Inventors: Margeigh J. Novotny, Greenbrae, CA (US); Stuart S. Bottom, Bellevue, WA (US); Lee Dicks Clark, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 14/229,411

(22) Filed: Mar. 28, 2014

(65) Prior Publication Data

US 2015/0278210 A1    Oct. 1, 2015

(51) Int. Cl.
*G06F 17/30* (2006.01)
*H04L 29/08* (2006.01)
*G06Q 30/02* (2012.01)

(52) U.S. Cl.
CPC .... *G06F 17/3053* (2013.01); *G06F 17/30864* (2013.01); *G06Q 30/0251* (2013.01);
(Continued)

(58) Field of Classification Search
CPC ........... G06F 17/2053; G06F 17/30864; G06F 17/3053; H04L 67/22; H04L 67/306;
(Continued)

(56) References Cited

U.S. PATENT DOCUMENTS 6,742,037 B1 * 5/2004 Hall ...................... H04W 92/18
  701/300
7,603,350 B1 * 10/2009 Guha ................ G06F 17/30864
(Continued)

FOREIGN PATENT DOCUMENTS

WO    2013057155 A1    4/2013
WO    2013085524 A1    6/2013

OTHER PUBLICATIONS

International Search Report and Written Opinion Issued in PCT Application No. PCT/US2015/022346, Mailed Date: Jul. 16, 2015, 12 Pages.
(Continued)

*Primary Examiner* — William Bashore
*Assistant Examiner* — Gregory A Distefano
(74) *Attorney, Agent, or Firm* — Fiala & Weaver P.L.L.C.

(57) ABSTRACT

A system is described that infers information about a user and then provides the user with an opportunity to provide input about (e.g., confirm or deny) the inferred information. Inferred information is presented to a user only after certain triggering events have occurred. For example, a sensitive item of inferred information may be presented to a user only after the user has reached a certain stage of relationship with a system, device or service that is deemed compatible with presenting such sensitive information. As another example, an item of inferred information may be presented to a user only after it has been determined that the item of inferred information is likely to be correct with a certain degree of confidence. As a still further example, both sensitivity and confidence level may be used to guide when a particular item of inferred information will be presented to a user.

20 Claims, 9 Drawing Sheets

(52) U.S. Cl.
CPC ..... *G06Q 30/0255* (2013.01); *G06Q 30/0269* (2013.01); *H04L 67/22* (2013.01); *H04L 67/306* (2013.01)

(58) Field of Classification Search
CPC  H04L 67/10; G06Q 30/0251; G06Q 30/0255; G06Q 30/0269
See application file for complete search history.

(56) References Cited

U.S. PATENT DOCUMENTS

| | | | |
|---|---|---|---|
| 2002/0173295 A1* | 11/2002 | Nykanen | H04L 67/18 455/414.1 |
| 2005/0076093 A1 | 4/2005 | Michelitsch et al. | |
| 2005/0076248 A1* | 4/2005 | Cahill | G06Q 20/0855 726/19 |
| 2005/0210285 A1* | 9/2005 | Williams | G06F 17/30867 726/5 |
| 2006/0041548 A1* | 2/2006 | Parsons | G06Q 30/02 |
| 2006/0149606 A1 | 7/2006 | Goan et al. | |
| 2007/0064626 A1* | 3/2007 | Evans | G06Q 10/10 370/254 |
| 2007/0106672 A1* | 5/2007 | Sighart | G06F 17/30867 |
| 2007/0282832 A1* | 12/2007 | Herley | G06F 21/6263 |
| 2008/0092156 A1* | 4/2008 | Ferrone | H04H 60/33 725/13 |
| 2008/0141307 A1* | 6/2008 | Whitehead | H04N 7/173 725/46 |
| 2011/0107434 A1* | 5/2011 | Chow | G06F 21/6245 726/28 |
| 2011/0276377 A1 | 11/2011 | Kim et al. | |
| 2012/0150888 A1 | 6/2012 | Hyatt et al. | |
| 2013/0007596 A1 | 1/2013 | Vandermolen et al. | |
| 2013/0054791 A1 | 2/2013 | Oki et al. | |
| 2013/0124449 A1* | 5/2013 | Pinckney | G06F 17/30867 706/52 |
| 2013/0340086 A1* | 12/2013 | Blom | G06F 21/6245 726/26 |
| 2014/0028606 A1* | 1/2014 | Giannetta | G06F 3/04886 345/174 |
| 2014/0236756 A1* | 8/2014 | Bourke | G06Q 30/0631 705/26.7 |
| 2014/0279722 A1* | 9/2014 | Singh | G06F 17/30702 706/11 |
| 2015/0032873 A1* | 1/2015 | Chen | H04L 67/22 709/224 |

OTHER PUBLICATIONS

Balabanovic, Marko, "An Interface for Learning Multi-topic User Profiles from Implicit Feedback", In Proceedings of 15th National Conference on Artificial Intelligence, Jul. 1998, 5 pages.

Tan, et al., "Learning User Profiles for Personalized Information Dissemination", In IEEE World Congress on Computational Intelligence, International Joint Conference on Neural Networks, vol. 1, May 4, 1998, 6 pages.

Hopfgartner, et al., "Personalised Video Retrieval: Application of Implicit Feedback and Semantic User Profiles", In Proceedings of ACM Sigir Forum vol. 44, Issue 2, Dec. 2012, 2 pages.

Zigoris, et al., "Bayesian Adaptive User Profiling with Explicit & Implicit Feedback", In Proceedings of ACM International Conference on Information and Knowledge Management, Nov. 6, 2006, 8 pages.

Spiegel, Stephan, "Personalized Information Recommendation based on Web User Profiles", In Thesis to Obtain a Master Degree, Jul. 12, 2008, 72 pages.

Ortega, Jose Vicente, "Personalization and Content-based Recommender Systems", Published on: Dec. 3, 2012, Available at: http://jvortega.wordpress.com/2012/12/03/personalization-and-content-based-recommender-systems/, 4 pages.

"Second Written Opinion Issued in PCT Application No. PCT/US2015/022346", Mailed Date: Mar. 4, 2016, 10 Pages.

"International Preliminary Report on Patentability Issued in PCT Application No. PCT/US2015/022346", Mailed Date: Jun. 8, 2016, 11 Pages.

* cited by examiner

BUILDING USER TRUST IN PROFILE CREATION AND RECOMMENDATIONS BASED ON MANAGED INTERACTION WITH USER

BACKGROUND

Within the field of computing, many systems exist that can infer information about an individual based on various signals and use such information to provide the individual with enhanced services and personalized content. For example, an e-commerce Web site may recommend products of interest to an individual based on inferences drawn from the individual's previous purchases. As another example, a search engine may present advertisements of interest to an individual that are based on inferences drawn from the individual's previous searches. However, such systems lack transparency. Users have no way to understand what is known about them, or to confirm or deny information that has been inferred about them. Since these systems do not include their users in the process of collecting inferred data, they can make the users feel as if they are being spied upon. Moreover, such systems may present users with suggested content based on assumed, un-true or partially-true information.

Some systems have sought to address this issue by offering their users a way to proactively record certain user profile data or affinity for certain entities. For example, some social networking Web sites provide users with the opportunity to populate a social profile that may then be used to deliver personalized content. However, this kind of approach can be burdensome for the users, since they are required to manually input the user profile data or affinity information.

SUMMARY

Systems, methods, apparatuses, and computer program products are described herein that infer information about a user and then provide the user with an opportunity to provide input about such inferred information (e.g. confirm or deny the inferred information). By actively involving the user in the process of collecting inferred data, embodiments described herein promote transparency and help establish trust between the user and the system with which they are engaging. Furthermore, by obtaining user input about the accuracy of inferred information, embodiments described herein can discriminate between correct and incorrect inferences. Consequently, such embodiments can obtain more accurate user information for driving the delivery of enhanced services and personalized content.

In addition to the foregoing, embodiments described herein solicit input from a user about inferred information only after certain thresholds have been reached or other triggering events have occurred. For example, an embodiment may solicit input from a user about a sensitive item of inferred information only after the user has reached a certain stage of relationship with a system, device or service that is deemed compatible with presenting such sensitive information. As another example, an embodiment may solicit input from a user about an item of inferred information only after it has been determined that the item of inferred information is likely to be correct with a certain degree of confidence. In a still further embodiment, both sensitivity level and confidence level are used to guide when input will be solicited from a user about a particular item of inferred information. In this way, embodiments can surface inferred information to a user in a matter that is socially appropriate and not exceedingly speculative or overwhelming.

As will be also be discussed herein, inferred information that has been confirmed by a user may be incorporated into a user profile that is accessible to the user. The user may then be enabled to view, modify, and remove data from the user-accessible user profile as well as manage how such data is used to provide services and/or customized content. Additionally, in accordance with embodiments described herein, user profile information may be obtained by a variety of different devices and services and incorporated into a centrally-stored user profile that is defined in accordance with a uniform schema, thereby facilitating the building and use of a single user profile across a variety of different device and service domains.

In particular, a method implemented by one or more computing devices is described herein. In accordance with the method, an item of information is inferred about a user based on at least one observed activity thereof. A sensitivity level associated with the item of information is determined. A current stage of relationship of the user with respect to a system, device or service is determined. A determination is made that the sensitivity level associated with the item of information is compatible with the current stage of relationship. In response to at least determining that the sensitivity level associated with the item of information is compatible with the current stage of relationship, a means by which the user can provide input about the item of information is presented to the user.

In one embodiment, the foregoing method further includes determining that the user has indicated that the item of information is true and, in response to determining that the user has indicated that the item of information is true, adding the item of information to a user profile that is accessible to the user.

In another embodiment, the foregoing method further includes determining that the user has indicated that the item of information is true or not true and adjusting the confidence level associated with the item of information based on the indication provided by the user.

In yet another embodiment, inferring the item of information is performed based on at least one interaction between the user and a digital personal assistant.

In still another embodiment, the means by which the user can provide input about the item of information is presented via a user interface of a digital personal assistant.

In a further embodiment, presenting via the user interface the means by which the user can provide input about the item of information comprises performing one or more of: presenting a question concerning the truthfulness of the item of information to which the user can answer yes or no; presenting a question and multiple user-selectable answers corresponding thereto, wherein only one of the answers corresponds to the item of information; and presenting an indication of a benefit that will accrue to the user from confirming whether or not the item of information is true.

In a still further embodiment, the foregoing method further includes selecting the means by which the user can provide input about the item of information from among a plurality of different means by which the user can provide input about the item of information, wherein the selecting is performed based at least on one or more of the sensitivity level associated with the item of information and the current stage of relationship.

In another embodiment, determining the current stage of relationship of the user with respect to the system, device or service includes determining the current stage of relationship based on one or more of: passage of time, frequency or amount of interaction by the user with the system, device or service, an amount of inferred information that has been confirmed by the user, and a nature of information that has been voluntarily provided or confirmed by the user.

In yet another embodiment, determining whether the sensitivity level associated with the item of information is compatible with the current stage of relationship includes comparing the sensitivity level associated with the item of information to a current stage of relationship for a particular topical domain.

A system is also described herein. The system includes one or more processors and one or more memory devices accessible to the one or more processors. The one or more memory devices store components for execution by the one or more processors. The components include an inference building component and a user confirmation component. The inference building component is operable to infer an item of information about a user based on at least one observed activity thereof and to assign a confidence level to the item of information. The user confirmation component is operable to determine that the confidence level associated with the item of information meets or exceeds a threshold and, in response to at least determining that the confidence level associated with the item of information meets or exceeds the threshold, to cause a means by which the user can provide input about the item of information to be presented to the user.

In an embodiment of the foregoing system, the user confirmation component is further operable to determine that the user has indicated that the item of information is true and, in response to determining that the user has indicated that the item of information is true, add the item of information to a user profile that is accessible to the user.

In another embodiment, the user confirmation component is further operable to determine that the user has indicated that the item of information is true or not true and to adjust the confidence level associated with the item of information based on the indication provided by the user.

In yet another embodiment, the inference building component is operable to determine the confidence level associated with the item of information based on one or more confidence levels respectively associated with one or more categorically-related or hierarchically-related items of information.

In still another embodiment, the inference building component is operable to infer the item of information based on at least one interaction between the user and a digital personal assistant.

In a further embodiment, the user confirmation component is operable to cause the means by which the user can provide input about the item of information to be presented to the user via a user interface of a digital personal assistant.

In a still further embodiment, the means by which the user can provide input about the item of information includes one or more of a question concerning the truthfulness of the item of information to which the user can answer yes or no, a question and multiple user-selectable answers corresponding thereto, wherein only one of the answers corresponds to the item of information, and an indication of a benefit that will accrue to the user from confirming whether or not the item of information is true.

In another embodiment, the user confirmation component is further operable to select the means by which the user can provide input about the item of information from among a plurality of different means by which the user can provide input about the item of information, wherein the selecting is performed based at least on the confidence level associated with the item of information.

A computer program product is also described herein. The computer program product includes a computer-readable memory having computer program logic recorded thereon that, when executed by at least one processor, causes the at least one processor to perform operations. In accordance with the operations, an item of information is inferred about a user based on at least one observed activity thereof. A confidence level and a sensitivity level associated with the item of information are determined. It is determined that the confidence level associated with the item of information meets or exceeds a threshold and that the sensitivity level associated with the item of information is compatible with a current stage of relationship of the user with respect to a system, device or service. In response to at least determining that the confidence level associated with the item of information meets or exceeds the threshold and that the sensitivity level associated with the item of information is compatible with the current stage of relationship, a means by which the user can provide input about the item of information is presented to the user.

In one embodiment of the foregoing computer program product, the operations further include determining that the user has indicated that the item of information is true and, in response to determining that the user has indicated that the item of information is true, adding the item of information to a user profile that is accessible to the user In another embodiment, the operations further include determining that the user has indicated that the item of information is true or not true and adjusting the confidence level associated with the item of information based on the indication provided by the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
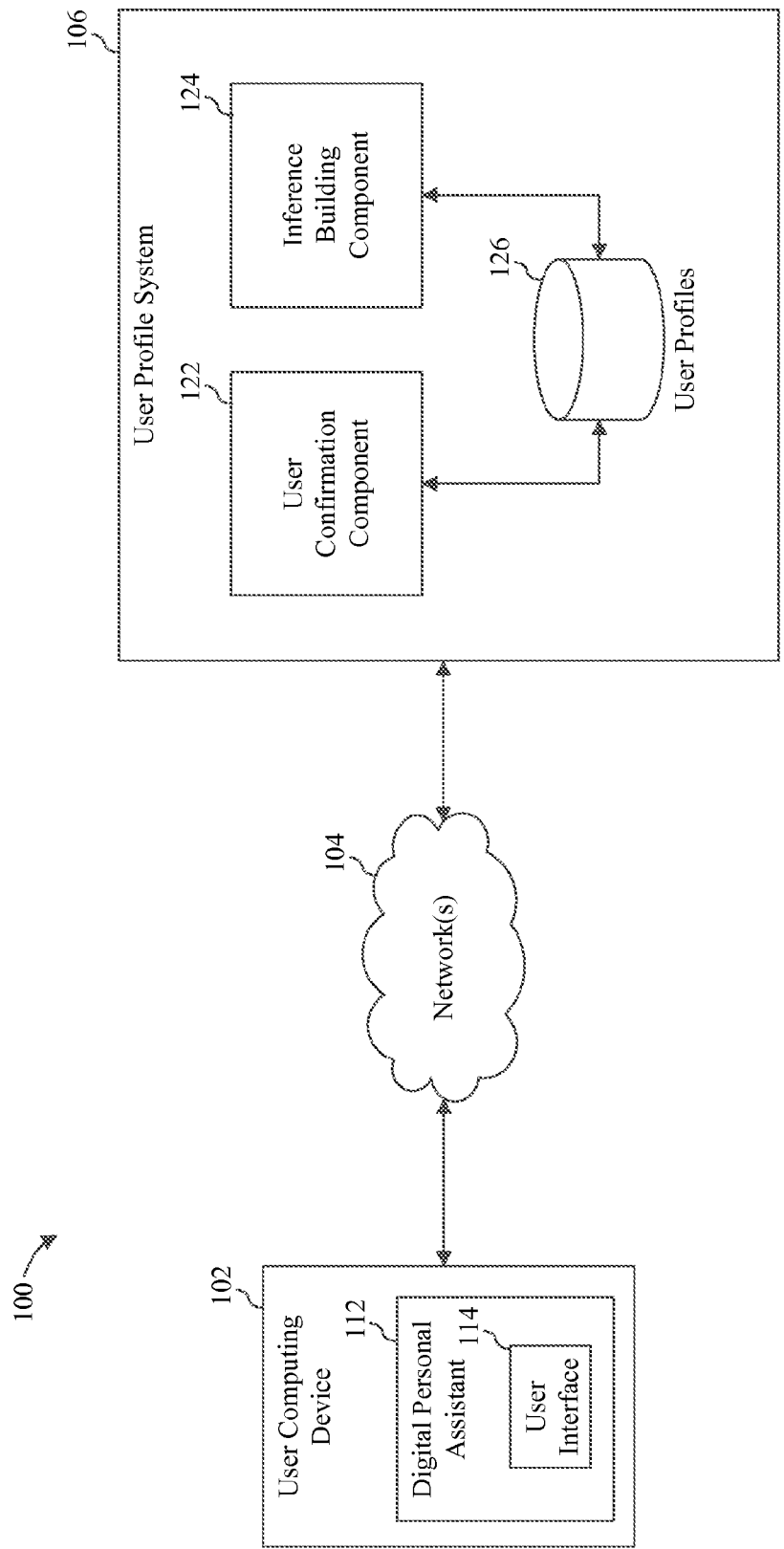
FIG. 1 is a block diagram of an example system that infers information about a user and selectively presents the user with a means by which to provide input about the inferred information in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Systems, methods, apparatuses, and computer program products are described herein that infer information about a user and then provide the user with an opportunity to provide input about such inferred information (e.g., confirm or deny the inferred information). By actively involving the user in the process of collecting inferred data, embodiments described herein promote transparency and help establish trust between the user and the system with which they are engaging. Furthermore, by obtaining user input about the accuracy of inferred information, embodiments described herein can discriminate between correct and incorrect inferences. Consequently, such embodiments can obtain more accurate user information for driving the delivery of enhanced services and personalized content.

In addition to the foregoing, embodiments described herein solicit input from a user about inferred information only after certain thresholds have been reached or other triggering events have occurred. For example, an embodiment may solicit input from a user about a sensitive item of inferred information only after the user has reached a certain stage of relationship with a system, device or service that is deemed compatible with presenting such sensitive information. As another example, an embodiment may solicit input from a user about an item of inferred information only after it has been determined that the item of inferred information is likely to be correct with a certain degree of confidence. In a still further embodiment, both sensitivity level and confidence level are used to guide when input is solicited from a user about a particular item of inferred information. In this way, embodiments can surface inferred information to a user in a matter that is socially appropriate and not exceedingly speculative or overwhelming.

As will be also be discussed herein, inferred information that has been confirmed by a user may be incorporated into a user profile that is accessible to the user. The user may then be enabled to view, modify, and remove data from the user-accessible user profile as well as manage how such data is used to provide services and/or customized content. Additionally, in accordance with embodiments described herein, user profile information may be obtained by a variety of different devices and services and incorporated into a centrally-stored user profile that is defined in accordance with a uniform schema, thereby facilitating the building and use of a single user profile across a variety of different device and service domains.

Section II describes example systems that implement the aforementioned features relating to the managed interaction with a user regarding inferred user information, as well as associated methods. Section III describes an ecosystem of devices and services that collectively build and utilize a shared user profile that is defined using a uniform user profile schema. Section IV describes an example mobile device that may implement various features described herein. Section V describes an example desktop computer that may implement various features described herein. Section VI provides some concluding remarks.

II. Example Systems and Methods for the Managed Interaction with a User Regarding Inferred User Information FIG. 1 is a block diagram of an example system 100 that infers information about a user and selectively presents to the user a means by which the user can provide input about the inferred information in accordance with an embodiment. As shown in FIG. 1, system 100 includes a user computing device 102 and a user profile system 106. User computing device 102 may be communicatively connected to user profile system 106 via one or more networks 104. Each of these components will now be described.

User computing device 102 is generally intended to represent a processor-based electronic device with which a user interacts to access certain functionality and/or obtain certain services. In one embodiment, user computing device 102 comprises a mobile computing device such as a mobile phone (e.g., a smart phone), a laptop computer, a tablet computer, or a netbook. User computing device 102 may conceivably comprise other types of mobile computing devices such as a wearable computer (e.g., a head-mounted computer), a portable media player, a personal digital assistant, a personal navigation assistant, a handheld gaming device, or any other mobile device capable of performing functions for and/or providing services to a user. One example of a mobile device that may incorporate the features of user computing device 102 will be discussed below in reference to FIG. 9. In another embodiment, user computing device 102 comprises a desktop computer, gaming console, or other non-mobile computing platform that is capable of performing functions for and/or providing services to a user. An example desktop computer that may incorporate the features of user computing device 102 will be discussed below in reference to FIG. 10.

As shown in FIG. 1, user computing device 102 includes a digital personal assistant 112. Digital personal assistant 112 comprises a software component that is stored in memory of user computing device 102 and executed therefrom by a processor (e.g., a microprocessor or other circuit operable to execute software instructions) that is communicatively connected to the memory. Such memory and processor are part of user computing device 102 but have not been shown in FIG. 1 for simplicity's sake only.

In an embodiment, digital personal assistant 112 is configured to perform tasks or services for a user of user computing device 102 based on input from the user as well as based on features such as location awareness and the ability to access information from a variety of sources including online sources (such as weather or traffic conditions, news, stock prices, user schedules, retail prices, etc.). Depending upon the implementation, examples of tasks that may be performed by digital personal assistant 112 on behalf of a user may include, but are not limited to, placing a phone call, launching an application, sending an e-mail message or a text message, playing music, scheduling a meeting or other event on a user calendar, obtaining directions to a location, obtaining a score associated with a sporting event, posting content to a social media Web site or a microblogging service, recording reminders or notes, obtaining a weather report, obtaining the current time, setting an alarm, obtaining a stock price, finding a nearby commercial establishment, performing an Internet search, or the like. Digital personal assistant 112 may use any of a variety of artificial intelligence techniques to improve its performance over time through continued interaction with the user. Digital personal assistant 112 may also be referred to as an intelligent personal assistant, an intelligent software assistant, a virtual personal assistant, or the like.

Digital personal assistant 112 is configured to provide a user interface 114 by which a user can submit questions, commands, or other verbal input and by which responses to such input may be delivered to the user. In an embodiment in which user computing device 102 includes or is connected to one or more microphones, the input may comprise user speech that is captured by the microphone(s), although this example is not intended to be limiting and user input may be provided in other ways as well. In an embodiment in which user computing device 102 includes or is connected to a display, the responses generated by digital personal assistant 112 may be made visible to the user in the form of text, images, or other visual content shown on the display. In an embodiment in which user computing device includes or is connected to one or more speakers, the responses may also comprise computer-generated speech or other audio content that is played back via the speaker(s).

In an embodiment, digital personal assistant 112 is configured to access a user profile associated with a user in order to provide enhanced services and/or personalized content to the user. Such user profile may be stored in memory of user computing device 102. Additionally or alternatively, such user profile may be stored remotely with respect to user computing device 102 (e.g., stored in a user profiles database 126) and accessed thereby via network(s) 104. As will be discussed in more detail herein, the user profile may be built at least in part by inferring information about a user and then selectively presenting the inferred information to the user so that the user can provide input about the inferred information (e.g., the user can confirm or deny the inferred information).

In the system shown in FIG. 1, the building and maintenance of the user profile is managed by user profile system 106. As will be discussed herein, user profile system 106 may build the user profile based on data obtained from user computing device 102 as well as from other sources. In the embodiment shown in FIG. 1, user profile system 106 comprises one or more computers (e.g., one or more server computers or other processor-based computing devices) that are remotely located with respect to user computing device 102. It is noted that in an alternate embodiment, the user profile system may be included within the user computing device itself. Such an embodiment will be described below in reference to FIG. 7.

Interaction between user computing device 102 and user profile system 106 may be carried out over network(s) 104. Network(s) 104 is intended to represent any type of network or combination of networks suitable for facilitating communication between computing devices, such as user computing device 102, and user profile system 106. Network(s) 104 may include, for example and without limitation, a wide area network, a local area network, a private network, a public network, a packet network, a circuit-switched network, a wired network, and/or a wireless network. Communication over such networks may be carried out using any of a variety of well-known network communication protocols.

User profile system 106 includes an inference building component 124 and a user confirmation component 122. Each of these components may comprise software components that are stored in one or more memories and that are executed by one or more processors (e.g., one or more microprocessors or other circuits operable to execute software instructions) that are communicatively connected to the one or more memories.

Inference building component 124 is operable to infer items of information about a user based on observed activities thereof. As used herein, the term "infer" means to deduce or conclude based on evidence and logic rather than based on explicit statements. Inference building component 124 may build inferences based on any of a wide variety of signals that may be obtained, for example, from user computing device 102, or from other sources. By way of example only and without limitation, inference building component 124 may infer items of information about a user based on activities performed by the user when using user computing device 102 (e.g., launching and/or using a particular application or service, making a phone call, scheduling an event on a calendar, sending, posting or otherwise sharing a message or other content, obtaining a service from or otherwise interacting with digital personal assistant 112, conducting an Internet search, or the like) and/or based on location data or sensor data obtained from user computing device 102. Inference building component 124 may use still other types of signals to infer items of information about a user, including but not limited to a user's activities with respect to one or more devices other than user computing device 102 and location data and/or sensor data obtained from such other device(s).

Inference building component 124 is further operable to store items of information that have been inferred about a user as part of a user profile associated with that user. The user profile may be stored in a user profiles database 126 (or other organized collection of data), which comprises part of user profile system 106. User profile database 126 may be stored, for example, in one or more memory devices accessible to inference building component 124 and user confirmation component 122.

In an embodiment, when inference building component 124 stores an inferred item of information about a user in user profile database 126, it also stores a confidence level associated therewith. The confidence level represents an estimated measure of the reliability or veracity of the inferred item of information. The confidence level may be represented using any of a variety of scales or grading systems (e.g., 0% to 100%, 1 to 10, letter grades such as A, B, C, D, and F, 1 to 5 stars, etc.) as will be appreciated by persons skilled in the relevant art(s).

In further accordance with such an embodiment, the confidence level associated with a particular item of information may be adjusted over time by either of inference building component 124 and user confirmation component 122. For example, inference building component 124 may update a confidence level associated with an item of information in a user's user profile based on one or more additional observed activities of the user. In this way, inference building component 124 can dynamically adjust the confidence level associated with an item of inferred information over time as evidence is accumulated that either tends to support or disprove the item of inferred information. The confidence level may be adjusted to indicate a greater or lesser degree of reliability or veracity.

As another example, inference building component 124 may adjust the confidence level associated with one item of information based on a confidence level associated with one or more categorically-related items of information. For example, in an embodiment, a plurality of information items may be included within a same category or sub-category of information items, and a change in the confidence level associated with one item of information within the category or sub-category may impact the confidence levels that are associated with other information items within the same category or sub-category. As another example, information items may be hierarchically organized such that one information item may be a parent to one or more other information items or a child of another information item. In this example, a change in the confidence level associated with one item of information may impact the confidence level associated with a parent or child information item in the hierarchy.

As will be described below, user confirmation component 122 may also adjust the confidence level associated with a particular item of information. In particular, user confirmation component 122 may adjust the confidence level associated with a particular item of information in response to a user providing input about the particular item of information after such item of information has been presented thereto.

User confirmation component 122 is configured to perform operations that enable a user of user computing device 102 to provide input about (e.g., confirm or deny) inferred items of information stored in their user profile. In particular, user confirmation component 122 is configured to determine whether one or more triggering events associated with a particular item of inferred information have occurred. If user confirmation component 122 determines that the triggering event(s) have occurred, then it will cause a means by which the user can provide input about the inferred item of information to be presented to the user. For example, user confirmation component 122 may set a flag or other indicator that is observable by user computing device 102 or send a signal, message, or other form of communication to user computing device 102, which may in turn cause digital personal assistant 112 or other software executing thereon to present to the user a means by which the user can provide input about the inferred item of information. Such input may include, but is not limited to, input that confirms or denies the inferred item of information. Examples of such means will be provided elsewhere herein.

In one embodiment, user confirmation component 122 operates to cause a means by which a user can provide input about an inferred item of information to be presented to the user only if the confidence level associated therewith meets or exceeds a reliability threshold. As will be appreciated by persons skilled in the relevant art(s), the threshold will vary depending on the type of scale or grading system used to represent the confidence level (e.g., the threshold may be a particular percentage value if the confidence level is represented using a range of 0%-100%, a particular letter grade if a letter grading system is used, etc.). By presenting the user with a means by which to provide input about the inferred item of information only after a certain level of confidence has been achieved, embodiments described herein can advantageously ensure that users are not presented with inferred information items in a manner that is too speculative or overwhelming.

Figure 2:
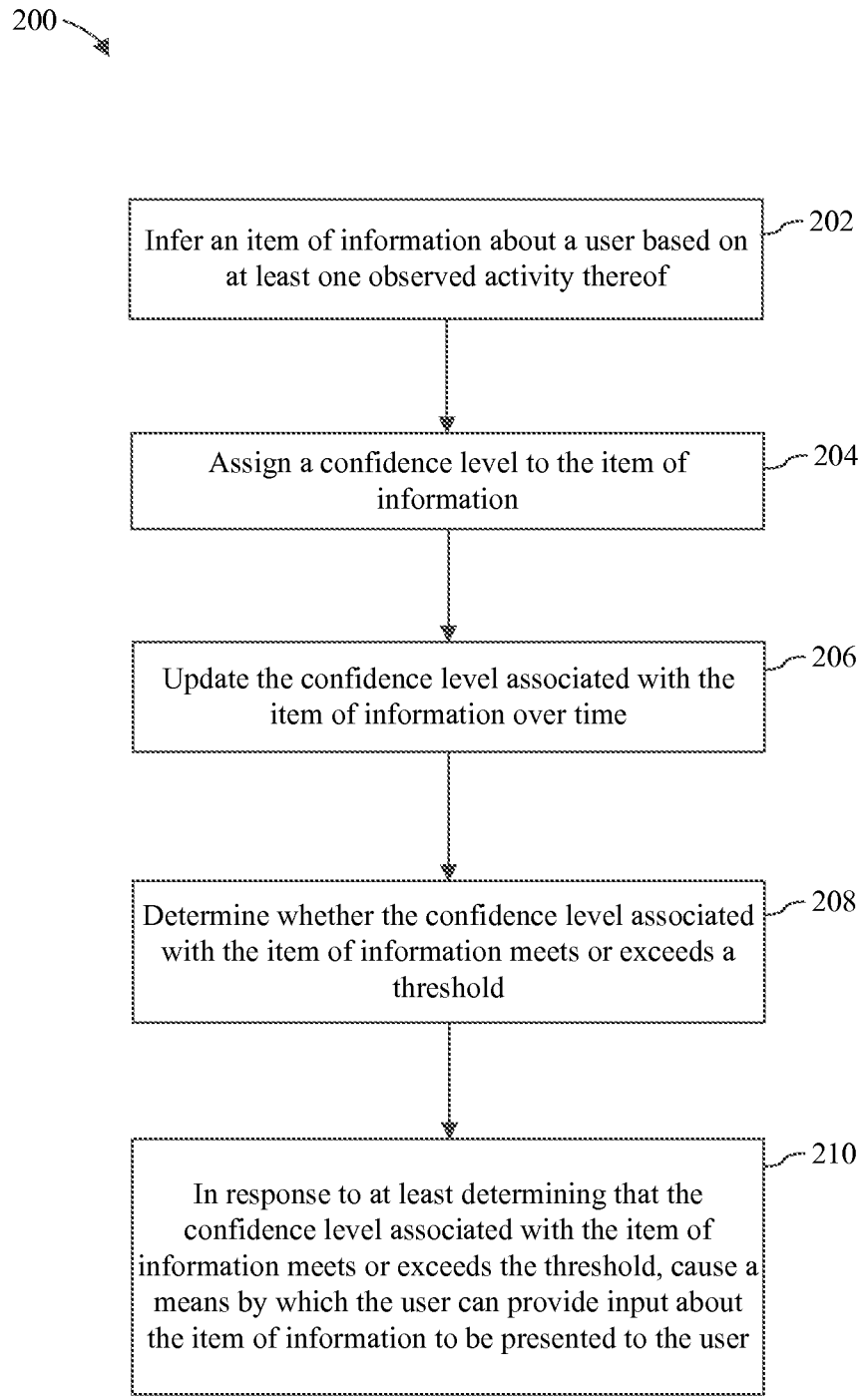
FIG. 2 depicts a flowchart of a first method by which a means for providing input about an inferred item of information may be selectively presented to a user in accordance with an embodiment.

To help further illustrate this functionality, FIG. 2 depicts a flowchart 200 of a first method by which user profile system 106 may operate to selectively cause a means for providing input about an inferred item of information to be presented to a user in accordance with an embodiment. Although the method of flowchart 200 will be described below with continued reference to components of system 100, persons skilled in the relevant art(s) will appreciate that the method can be performed by other components and systems entirely.

As shown in FIG. 2, the method of flowchart 200 begins at step 202, in which inference building component 124 infers an item of information about a user based on at least one observed activity thereof. As one example, assume that inference building component 124 infers that the user likes Thai food based on the fact that the user has conducted an Internet search for Thai food restaurants.

At step 204, inference building component 124 assigns a confidence level to the item of information. With continued reference to the foregoing example, assume that inference building component 124 assigns an initial confidence level of 30% to the inference that the user likes Thai food. In an embodiment, inference building component 124 stores the item of information and the confidence level associated therewith in a database, such as user profiles database 126.

At step 206, inference building component 124 updates the confidence level associated with the item of information over time. With continued reference to the foregoing example, inference building component 124 may increase the confidence level associated with the inference that the user likes Thai food based on the fact that the user has frequently visited a location that is known to be a Thai food restaurant or that the user has purchased ingredients for making Thai food online. Of course, inference building component 124 may also decrease the confidence level associated with the inference that the user likes Thai food based on other activities.

At step 208, user confirmation component 122 determines whether the confidence level associated with the item of information meets or exceeds a threshold. For example, with continued reference to the foregoing example, assume that the threshold is 70% and that inference building component 124 recently updated the confidence level associated with the fact that the user likes Thai food from 55% to 75%. In this case, user confirmation component 122 will determine that the confidence level associated with the fact that the user likes Thai food exceeds the threshold.

If user confirmation component 122 determines during step 208 that the confidence level meets or exceeds the threshold then, in response to at least this determination, user confirmation component 122 causes a means by which the user can provide input about the item of information to be presented to the user as shown at step 210. Such means may include, for example and without limitation, a means by which the user can confirm whether or not the item of information is true. For example, with continued reference to the foregoing example, in response to determining that the confidence level associated with the fact that the user likes Thai food exceeds 70%, user confirmation component 122 may set a flag or other indicator that is observable by user computing device 102 or send a signal, message, or other form of communication to user computing device 102, which may in turn cause digital personal assistant 112 or other software executing thereon to present to the user a means by which the user provide input about the inferred fact that the user likes Thai food. In further accordance with this example, this may comprise presenting the user with the question "Do you like Thai food?" via user interface 114 of digital personal assistant 112, to which the user may respond "yes" or "no." A variety of other means by which the user can provide input about an item of information will be described elsewhere herein.

However, if user confirmation component 122 determines during step 208 that the confidence level does not meet or exceed the threshold, then user confirmation component 122 will not cause a means to provide input about the item of information to be presented to the user.

It is noted that different thresholds may be assigned to different items of inferred information, or to different types, categories, or collections of inferred information. For certain items of information, a very high threshold may be set such that an opportunity to provide input about the data will only be presented to the user when the system has the utmost confidence that the data is correct. For other items of information, a very low threshold may be set such that an opportunity to provide input about the data will be presented to the user even when the system has a very low confidence that the data is correct. For some items of information, the threshold may be set such that it will be met or exceeded by any confidence level (e.g., the threshold may be set to 0%). For these items of information, a solicitation of input from the user may be triggered simply by the inferring of the item of information in the first place.

As noted above, in response to determining that one or more triggering events have occurred, user confirmation component 122 performs operations that enable a user of user computing device 102 to provide input about inferred items of information stored in their user profile. In the method of flowchart 200, the triggering event comprises a determination that the confidence level associated with an inferred item of information meets or exceeds a threshold. In another embodiment that will now be described, the triggering event comprises a determination that a sensitivity level associated with an inferred item of information is compatible with a current stage of relationship between a user and a system, device or service.

In accordance with such an embodiment, a sensitivity level is assigned to inferred items of information stored in user profiles database 126. The sensitivity level is intended to represent how personal or delicate an item of information is. For example, the fact that user lives in a particular city or state may be deemed to be information having a low sensitivity level. However, the fact that a user is in a romantic relationship or is in a certain income bracket may be deemed to be moderately to highly sensitive information. Depending upon the implementation, a variety of different scales or grading systems may be used to represent sensitivity levels.

In further accordance with such an embodiment, user confirmation component 122 is operable to determine a current stage of relationship between a user and a system (e.g., a system that includes one or more devices and/or one or more services), a device (e.g., user computing device 102 or some other device) or between the user and a service (e.g., digital personal assistant 112, a search engine, an e-commerce Web site, or some other entity). This embodiment is premised in part on the notion that the progress of a relationship between a user and a system/device/service can be tracked through various stages, wherein advanced stages are marked by an increased level of trust between the user and the system/device/service as compared to earlier stages.

Any of a wide variety of factors may be used to determine what stage of relationship a user has progressed to with respect to a system, device or service. For example, depending upon the implementation, various factors may be considered including but not limited to the passage of time (e.g., time since the user first started using the system, device or service), a frequency or amount of interaction by the user with the system, device or service, an amount of inferred information that has been confirmed by the user (e.g., overall or within a particular stage of relationship), the nature of information (including the sensitivity level thereof) that has been voluntarily provided or confirmed by the user, or some combination thereof. Still other factors may be considered in determining what stage of relationship the user has reached with a system, device or service.

User confirmation component 122 may be further configured to cause a means for providing input about an inferred item of information to be presented to a user only if it determines that the sensitivity level associated with the item of information is compatible with the current stage of relationship between the user and the system/device/service. For example, user confirmation component 122 may be configured to delay the presentation of inferred items of information having a high sensitivity level until such time as the user achieves a stage of relationship with a system/device/service that indicates a correspondingly high degree of trust. In this manner, embodiments described herein can advantageously ensure that users are presented with sensitive items of inferred information in a manner that is likely to be deemed socially appropriate and inoffensive.

Figure 3:
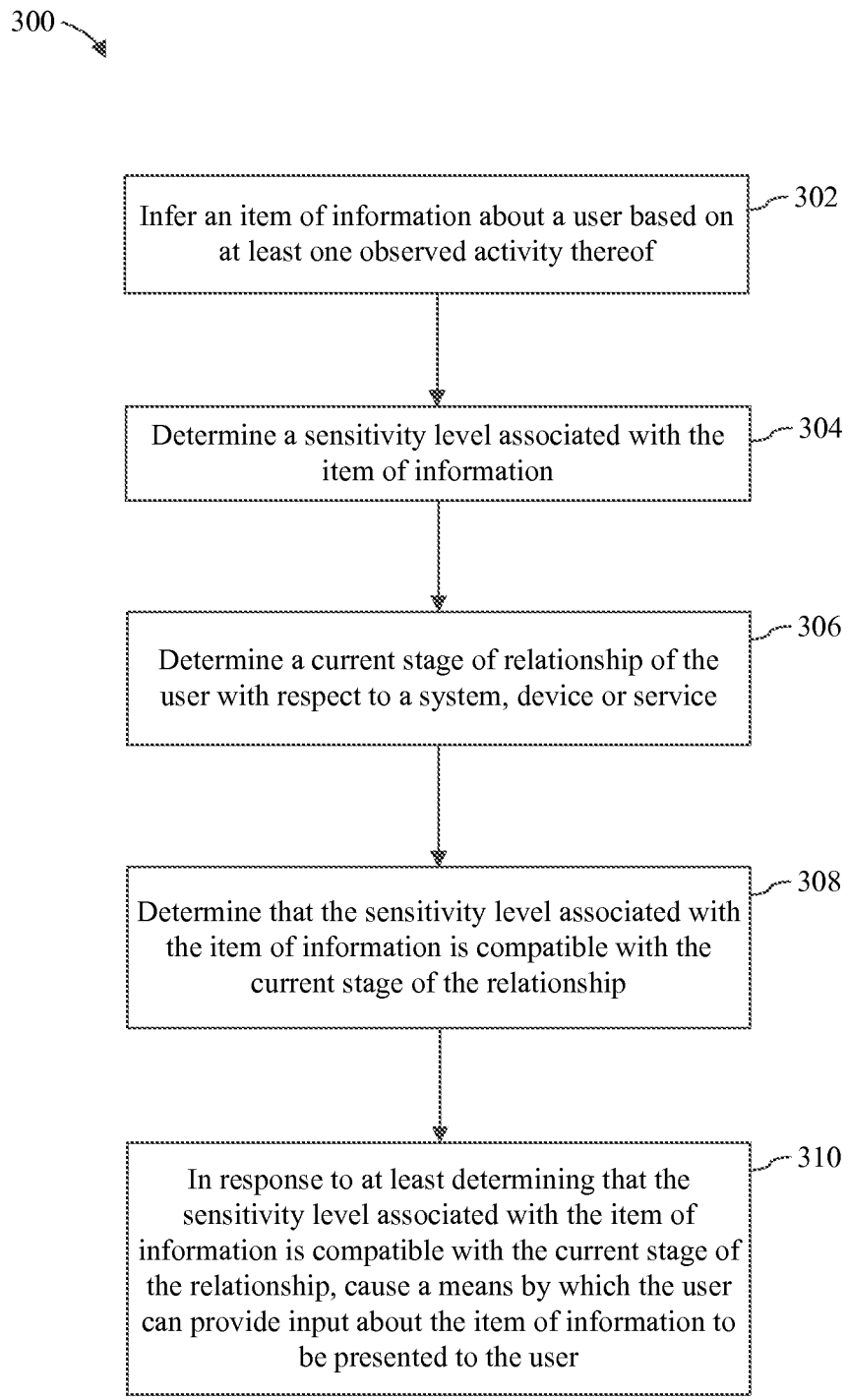
FIG. 3 depicts a flowchart of a second method by which a means for providing input about an inferred item of information may be selectively presented to a user in accordance with an embodiment.

To help further illustrate this functionality, FIG. 3 depicts a flowchart 300 of a second method by which user profile system 106 may operate to selectively cause a means for providing input about an inferred item of information to be presented to a user in accordance with an embodiment. Although the method of flowchart 300 will be described below with continued reference to components of system 100, persons skilled in the relevant art(s) will appreciate that the method can be performed by other components and systems entirely.

As shown in FIG. 3, the method of flowchart 300 begins at step 302, in which inference building component 124 infers an item of information about a user based on at least one observed activity thereof. As one example, assume that inference building component 124 infers that the user is married to a person named "John Doe" based on the fact that the user has identified the particular person as their spouse on a social networking Web site or based on some other activity.

At step 304, user confirmation component 122 determines a sensitivity level associated with the item of information. With continued reference to the foregoing example, assume that it is determined that a sensitivity level of "moderately sensitive" has been associated with the inferred fact that the user is married to John Doe.

At step 306, user confirmation component 122 determines a current stage of relationship of the user with respect to a system, device or service. For example, in accordance with one embodiment, user confirmation component 122 may determine that the user is in a formal stage, a semi-formal stage, or a familiar stage with respect to a system, device or service. It will be apparent to persons skilled in the relevant art(s) that other methodologies for defining different relationship stages may be used. With continued reference to the foregoing example, assume that user confirmation component 122 determines that the user is in a familiar stage of relationship with a system, device or service.

At step 308, user confirmation component 122 determines whether the sensitivity level associated with the item of information is compatible with the current stage of relationship. For example, with continued reference to the foregoing example, user confirmation component 122 may determine that the sensitivity level of "moderately sensitive" that is associated with the inferred fact that the user is married to John Doe is compatible with the current relationship stage of "familiar."

If user confirmation component 122 determines during step 308 that the sensitivity level is compatible with the current stage of relationship, then, in response to at least this determination, user confirmation component 122 causes a means by which the user can provide input about the item of information to be presented to the user as shown at step 310. For example, with continued reference to the foregoing example, in response to determining that the sensitivity level associated with the fact that the user is married to John Doe is compatible with the current stage of relationship, user confirmation component 122 may set a flag or other indicator that is observable by user computing device 102 or send a signal, message, or other form of communication to user computing device 102, which in turn causes digital personal assistant 112 or other software executing thereon to present to the user a means by which the user can provide input about the inferred fact the user is married to John Doe. In further accordance with this example, this may comprise presenting the user with the question "Are you married to John Doe?" via user interface 114 of digital personal assistant 112, to which the user may respond "yes" or "no." A variety of other means by which the user can provide input about an item of information will be described elsewhere herein.

However, if user confirmation component 122 determines during step 308 that the sensitivity level is not compatible with the current stage of relationship, then user confirmation component 122 will not cause a means for providing input about the item of information to be presented to the user.

In certain embodiments, a stage of relationship between a user and a system/device/service may be tracked for each one of a plurality of different topical domains. For example, it may be determined that a user has developed a deep level of comfort interacting with digital personal assistant 112 about health-related topics but is not at all comfortable interacting with digital personal assistant 112 about topics related to personal finances. In this case, the user may be deemed to have reached an advanced stage of relationship with digital personal assistant 112 with respect to health-related topic, but to be at an early stage of relationship with digital personal assistant 112 with respect to the topic of personal finances. In accordance with such embodiments, step 308 of flowchart 300 may comprise determining whether the sensitivity level of an inferred item of information associated with a particular topic is compatible with the current stage of relationship for a particular topical domain.

Figure 4:
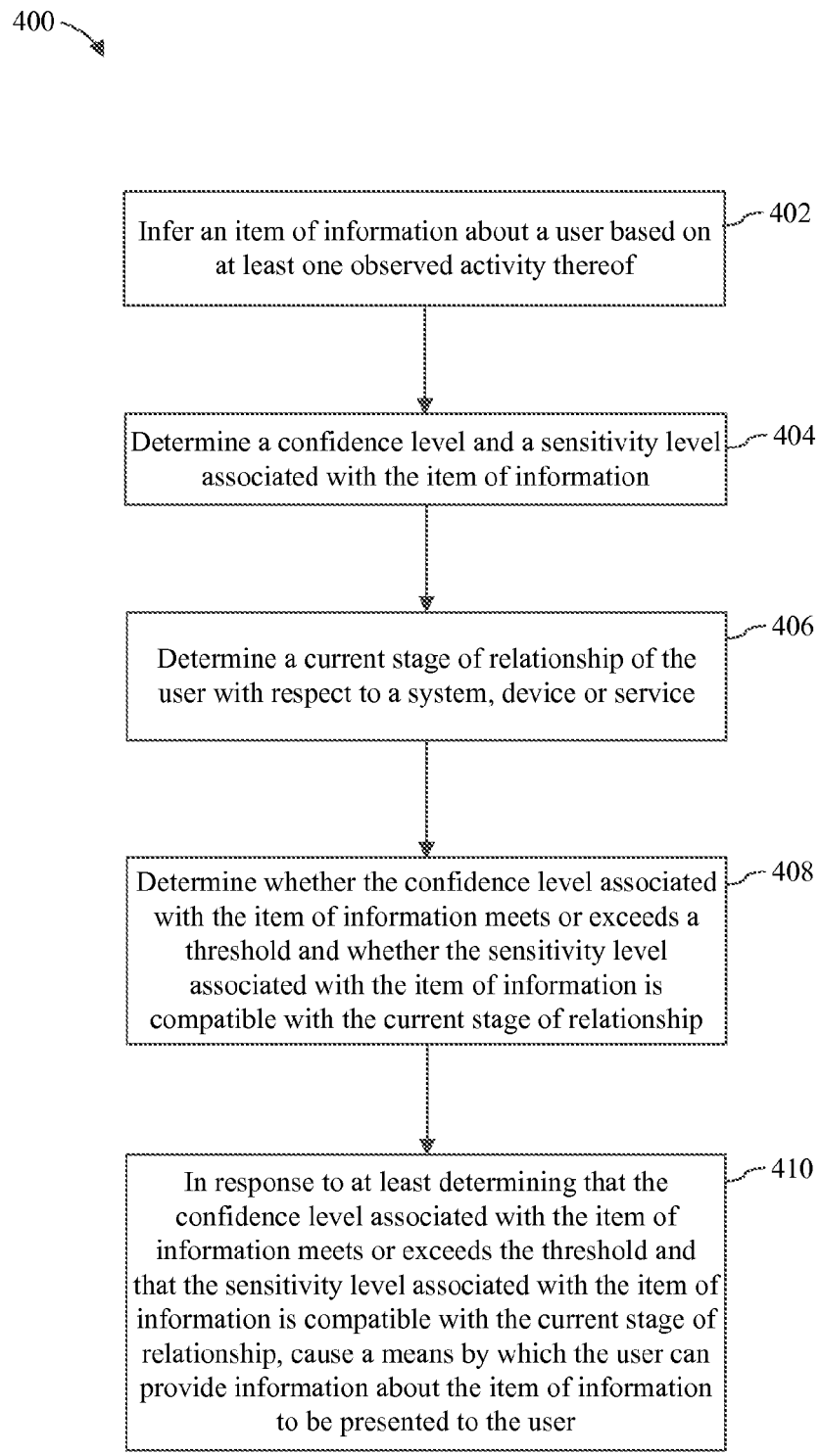
FIG. 4 depicts a flowchart of a third method by which a means for providing input about an inferred item of information may be selectively presented to a user in accordance with an embodiment.

In a further embodiment, user confirmation component 122 does not cause a means for providing input about item of inferred information to be presented to a user until both (1) a particular confidence level threshold had been reached for the item of information and (2) the sensitivity level of the item of information is compatible with the current stage of relationship between the user and a system/device/service. To help further illustrate this functionality, FIG. 4 depicts a flowchart 400 of a third method by which user profile system 106 may operate to selectively cause a means for providing input about an inferred item of information to be presented to a user in accordance with an embodiment. Although the method of flowchart 400 will be described below with continued reference to components of system 100, persons skilled in the relevant art(s) will appreciate that the method can be performed by other components and systems entirely.

As shown in FIG. 4, the method of flowchart 400 begins at step 402, in which inference building component 124 infers an item of information about a user based on at least one observed activity thereof.

At step 404, user confirmation component 122 determines both a confidence level associated with the item of information and a sensitivity level associated with the item of information.

At step 406, user confirmation component 122 determines a current stage of relationship of the user with respect to a system, device or service.

At step 408, user confirmation component 122 determines whether the confidence level associated with the item of information meets or exceeds a threshold and whether the sensitivity level associated with the item of information is compatible with the current stage of relationship.

If user confirmation component 122 determines during step 408 that the confidence level meets or exceeds the threshold and the sensitivity level is compatible with the current stage of relationship, then, in response to at least this determination, user confirmation component 122 causes a means by which the user can provide information about the item of information to be presented to the user. This is shown at step 410.

However, if user confirmation component 122 determines during step 408 that either the confidence level does not meet or exceed the threshold or the sensitivity level is not compatible with the current stage of relationship, then user confirmation component 122 will not cause a means for providing input about the item of information to be presented to the user.

In the foregoing description of the operation of user confirmation component 122, it was explained that a means for providing input about an inferred item of information may be presented to a user based on one or both of a confidence-level trigger or a sensitivity-level trigger. However, it is noted that other factors may be considered in addition to the confidence level or sensitivity level associated with an item of inferred information. For example, user confirmation component 122 may also consider a current user context in determining whether or not to solicit information from a user about an inferred item of information. A user context may potentially be defined in accordance with previously-confirmed user profile items. For example, user confirmation component 122 may be configured to solicit information from a user about an inferred item of information related to the user's work life only during the user's dedicated office hours (which may be a confirmed inference) and while the user is at their work location (which may also be a confirmed inference). Generally speaking, by using such an approach, user confirmation component 122 can ensure that a particular inferred item of information is presented to a user at an appropriate time/place.

As was previously noted, a variety of means may be provided by which the user can provide input about an inferred item of information. Such means may be presented to the user via user interface 114 of digital personal assistant 112 or via some other suitable user interface. The means may comprise information that is presented to the user in the form of text, audio, graphics, video, or some combination thereof, and may also include a means by which the user may provide input responsive to or about the presented information. The user input may be provided, for example, via a graphical user interface, voice user interface, or some other user interface that is accessible to the user.

For example, in one embodiment, the user may be presented with a direct question concerning the truthfulness or accuracy of an inferred fact, such as "Do you have a pet fish?" The user may also be provided a means by which to provide a yes or no answer to the question. It is noted that in embodiments, a user may ignore a question or request for confirmation, and this in and of itself may impact the confidence level associated with the inferred item of information.

In another embodiment, the user may be presented with an inferred item of information, a confidence rating associated therewith, and a means by which to adjust the confidence rating. For example, the user may be able to replace or adjust the confidence level associated with the inferred item of information.

In yet another embodiment, the user may be presented with a range of options to choose from, only one of which corresponds to the inferred item of information. For example, the user may be presented with a question and multiple user-selectable answers corresponding thereto, wherein only one of the answers corresponds to the inferred item of information. This approach may be utilized, for example, when presenting an inferred item of information that is deemed sensitive or which may cause the user to be uncomfortable with how the data was acquired.

In a further embodiment, an indication of a benefit that will accrue to the user from confirming whether or not an inferred item of information is true may be presented to the user. The benefit may be in the form of a useful service that can be provided based on the confirmed item of information. For example, while asking the user to confirm that a certain location is his driving destination, a map of traffic en route to that location may simultaneously be displayed to the user. As another example, while asking the user to confirm whether he or she is shopping for a particular item, a list of local stores having such items on sale may be displayed to the user. Still other benefits that will accrue to the user from confirming whether or not an inferred item of information is true may be indicated and provided. Such an approach may advantageously help to build a user's trust in the system.

In further embodiments, other types of input about an item of inferred information may be solicited from a user. For example, the user may be presented with the opportunity to apply "weights" to items of information, to apply conditions to items of information, or to edit or otherwise correct items of information to make them more accurate. By way of further illustration, a user may be asked if he/she is interested in hiking and, during a confirmation process, the user might be presented with the opportunity to do one or more of: rate hiking on a scale of importance from 1 to 10, specify conditions concerning his/her interest in hiking (e.g., he/she is only interested in hiking when the weather is sunny), or modify the inference that he/she is interested in hiking in some way to make it more accurate (e.g., modify the inference to indicate that he/she is interested specifically in group hikes). However, these are examples only, and persons skilled in the relevant art(s) will appreciate that other techniques may be implemented for soliciting input from a user about an inferred item of information.

It can be seen from the foregoing that a variety of different means may be used to obtain input from a user about an inferred item of information. In one embodiment, user confirmation component 122 selects a particular means (or one or more means) by which the user can provide input about an inferred item of information from among a plurality of such means based on a sensitivity level associated with the inferred item of information and/or a current stage of relationship between the user and a system/device/service. In this way, the type of interaction that is used to solicit input about an inferred item of information can be premised on how sensitive the item of information is and/or how comfortable the user is with the system. For example, more direct approaches for soliciting user input can be used for items of information having a low sensitivity and/or when the user is very comfortable with the system, and more subtle approaches can be used for items of information that are highly sensitive and/or when the user is not very comfortable with the system.

In a further embodiment, user confirmation component 122 may select a particular means by which a user can provide input about an inferred item of information from among a plurality of such means based on a confidence level associated with the inferred item of information. In this way, the type of interaction that is used to solicit input about an inferred item of information can be premised on how confident the system is that the inferred item of information is correct.

Once a user has provided input about an item of information, such input may be used to adjust the confidence level associated with that item of information. For example, if a user indicates that an item of information is true, the confidence level associated with that item of information may be adjusted upward (e.g., to 100% or some other increased level). If a user indicates that an item of information is not true, then the confidence level associated with that item of information may be adjusted downward (e.g., to 0% or some other decreased level).

Figure 5:
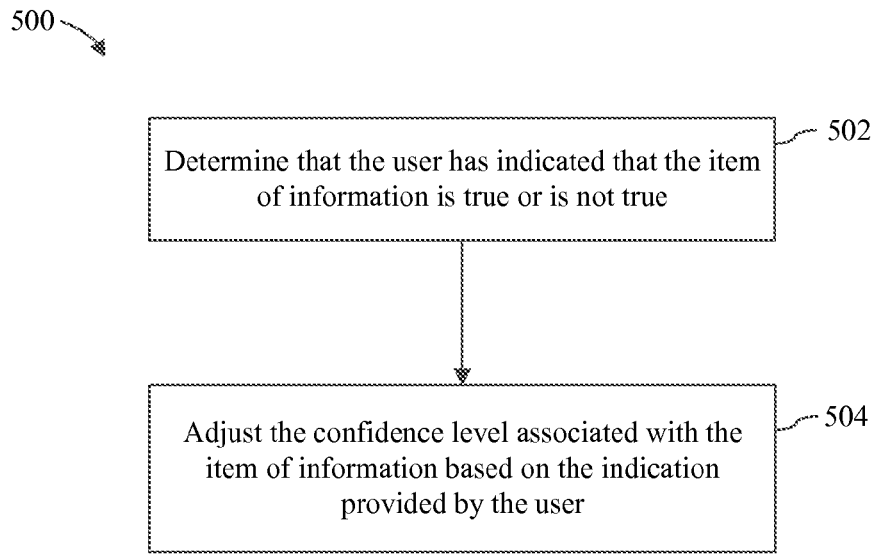
FIG. 5 depicts a flowchart of a method for adjusting the confidence level associated with an item of inferred information based on input provided a user in accordance with an embodiment.

This process is illustrated in FIG. 5. In particular, FIG. 5 depicts a flowchart 500 of a method for adjusting the confidence level associated with an item of inferred information based on input provided a user in accordance with an embodiment. Although the method of flowchart 500 will be described below with continued reference to components of system 100, persons skilled in the relevant art(s) will appreciate that the method can be performed by other components and systems entirely.

As shown in FIG. 5, the method of flowchart 500 begins at step 502, in which user confirmation component 122 determines that a user has indicated that an inferred item of information is true or not true. At step 504, user confirmation component 122 adjusts a confidence level associated with the inferred item of information based on the indication provided by the user. It is noted that user input with respect to one item of inferred information may impact the confidence level associated with one or more different items of inferred information.

In a further embodiment, once a user has indicated that an inferred item of information is true, the item of information may be added to a user profile that is accessible to the user (e.g., visible and/or modifiable by the user). This process is illustrated in FIG. 6.

Figure 6:
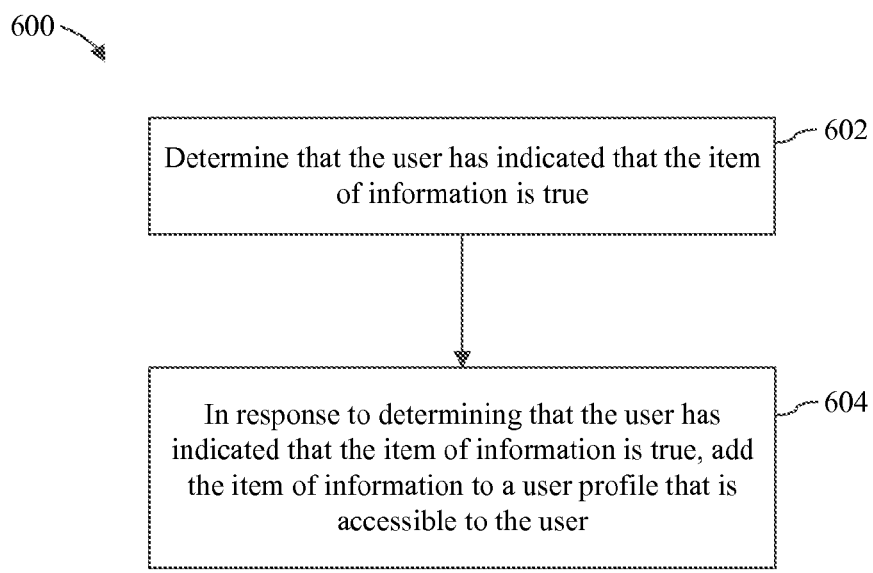
FIG. 6 depicts a flowchart of a method for selectively adding an item of inferred information to a user-accessible user profile in accordance with an embodiment.

In particular, FIG. 6 depicts a flowchart 600 of a method for selectively adding an item of inferred information to a user-accessible user profile in accordance with an embodiment. Although the method of flowchart 600 will be described below with continued reference to components of system 100, persons skilled in the relevant art(s) will appreciate that the method can be performed by other components and systems entirely.

As shown in FIG. 6, the method of flowchart 600 begins at step 602, in which user confirmation component 122 determines that a user has indicated that an inferred item of information is true. At step 604, in response to determining that the user has indicated that the inferred item of information is true, user confirmation component 122 adds the item of information to a user profile that is accessible to the user.

Depending upon the implementation, once an item of information has been added to a user-accessible user profile, the user may be permitted to view the item of information, modify it, or remove it. The user may also be permitted to add new profile data manually. The user may further manage how profile data is used to provide services and/or customized content. This can also aid in establishing user trust through transparency. A user may also be enabled to rate items of information in the user-accessible user profile as well as services and customized content delivered based on such data. These user ratings may be used to further personalize services and content and to adjust the confidence ratings associated with other items of information.

Figure 7:
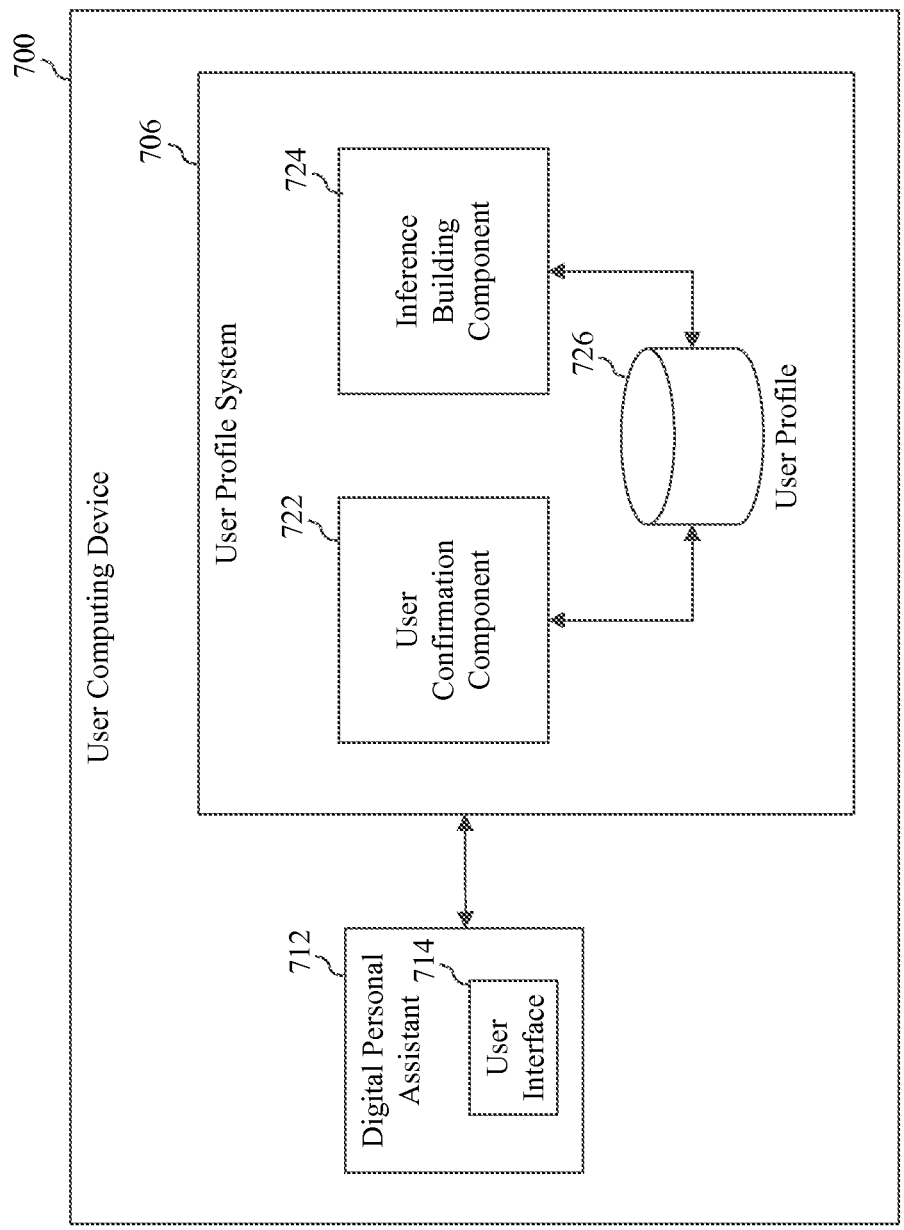
FIG. 7 is a block diagram of a user computing device that infers information about a user and selectively presents the user with a means by which to provide input about the inferred information in accordance with an embodiment.

In system 100 of FIG. 1, user profile system 106 is located remotely with respect to user computing device 102. FIG. 7 is a block diagram of an alternative implementation in which a user profile system 706 is actually included within a user computing device 700. In particular, as shown in FIG. 7, user computing device 700 includes a digital personal assistant 712 and user interface 714 associated therewith, which are analogous to digital personal assistant 112 and user interface 114 of system 100 as described above and perform similar functions. As further shown in FIG. 7, user computing device 700 also includes a user profile system 706 that includes a user confirmation component 722, an inference building component 724, and a stored user profile 726. User confirmation component 722 and inference building component 724 are analogous to user confirmation component 122 and inference building component 124 of system 100 and perform similar functions. In particular, these components build user profile 726 by inferring items of information and selectively seeking user input about such inferred items of information. However, user confirmation component 722 and inference building component 724 operate locally with respect to user computing device 700. In accordance with this implementation, these components may only build user profiles for a user or users of user computing device 700.

Still other implementations are possible. For example, in one embodiment, a user confirmation component similar to user confirmation component 122 or 722 may be located on a user computing device, while an inference building component similar to inference building component 124 or 724 may be executed remotely with respect to the user computing device.

Furthermore, although embodiments described above generate a user profile based on user interactions with a digital personal assistant and also contemplate the leveraging of a user profile by a digital personal assistant to provide enhanced services and personalized content, it is to be understood that the techniques described herein may generally be applied to any automated system, device or service with which a user interacts to obtain information. For example, the techniques described herein may be applied to Web browsers, search engines, navigation systems, e-commerce Web sites, social networking Web sites or applications, in-car communication and assistance systems, and the like.

III. Example System with User Profile Shared by Multiple Devices and Services In certain embodiments, user profile information may be obtained by a variety of different devices and services and incorporated into a centrally-stored user profile that is defined in accordance with a uniform schema, thereby facilitating the building and use of a single user profile across a variety of different device and service domains. This is illustrated by FIG. 8.

Figure 8:
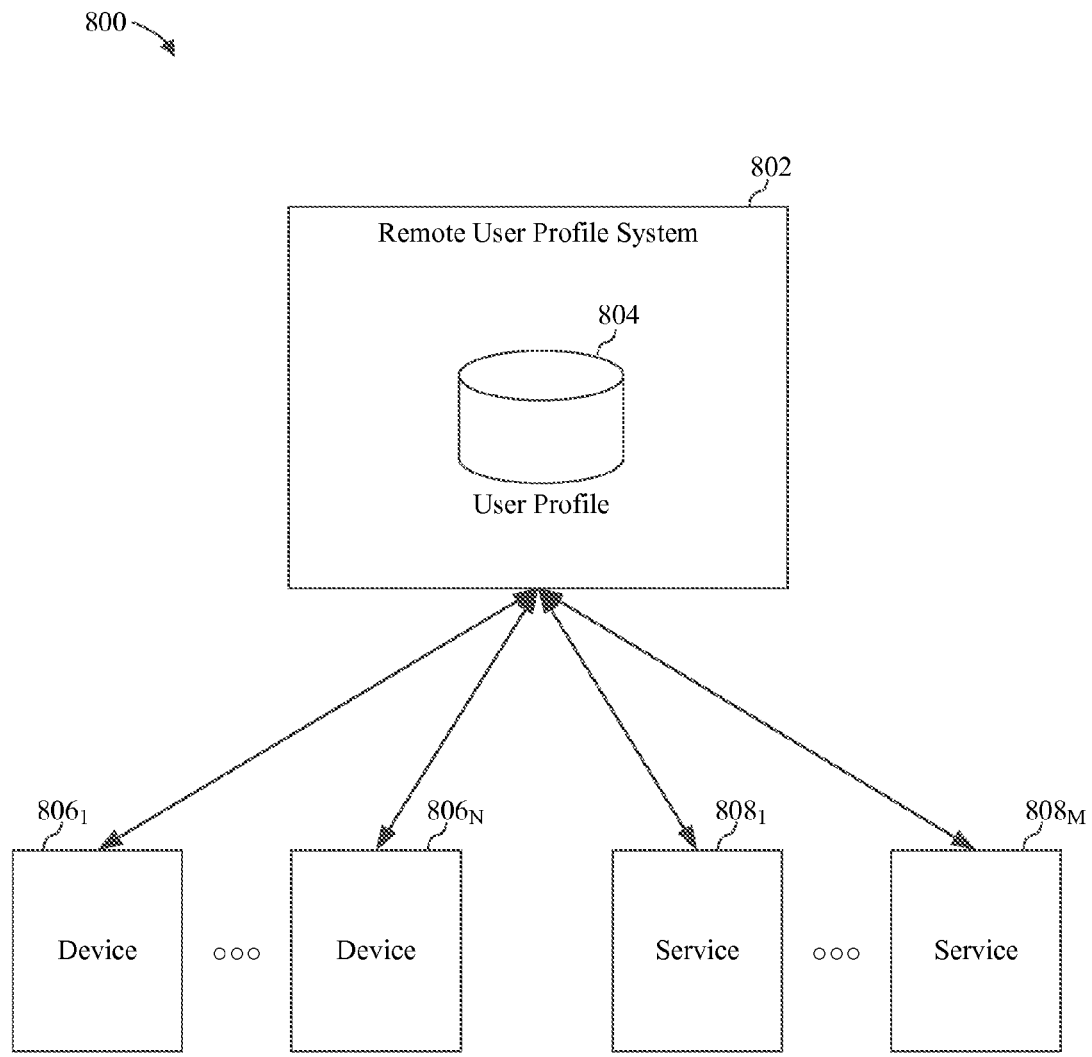
FIG. 8 is a block diagram of a system in accordance with an embodiment in which a user profile system centrally stores a user profile that is defined in accordance with a uniform schema and interacts with a variety of different devices and services to build and utilize the user profile.

In particular, FIG. 8 is a block diagram of a system 800 that includes a user profile system 802 that centrally stores a user profile 804 that is defined in accordance with a uniform schema. A plurality of devices $806_1$-$806_N$ may communicatively connect to user profile system 802 to provide information for insertion into user profile 804 and/or to provide activity data from which user profile information may be inferred. Devices $806_1$-$806_N$ may include, for example, a smartphone, a tablet computer, a desktop computer, and a gaming console, although these are only examples.

Likewise, a plurality of services $808_1$-$808_m$ may communicatively connect to user profile system 802 to provide information for insertion into user profile 804 and/or to provide activity data from which user profile information may be inferred. Services $808_1$-$808_m$ may include, for example, a search engine, an e-commerce Web page or application, and a social networking Web page or application, although these are only examples.

Each one of devices $806_1$-$806_N$ and services $808_1$-$808_N$ may also access user profile 804 and the information included therein and utilize such information to provide enhanced services and personalized content to the user associated therewith. Since user profile 804 is defined in accordance with a uniform schema, these devices and services can be easily programmed to process and interpret the data stored therein correctly. Moreover, since user profile 804 is defined in accordance with a uniform schema, it is possible for $806_1$-$806_N$ and services $808_1$-$808_N$ to copy all or a portion of user profile 804 for local use and then later synchronize the local copy of the user profile with the shared copy.

IV. Example Mobile Device Implementation

Figure 9:
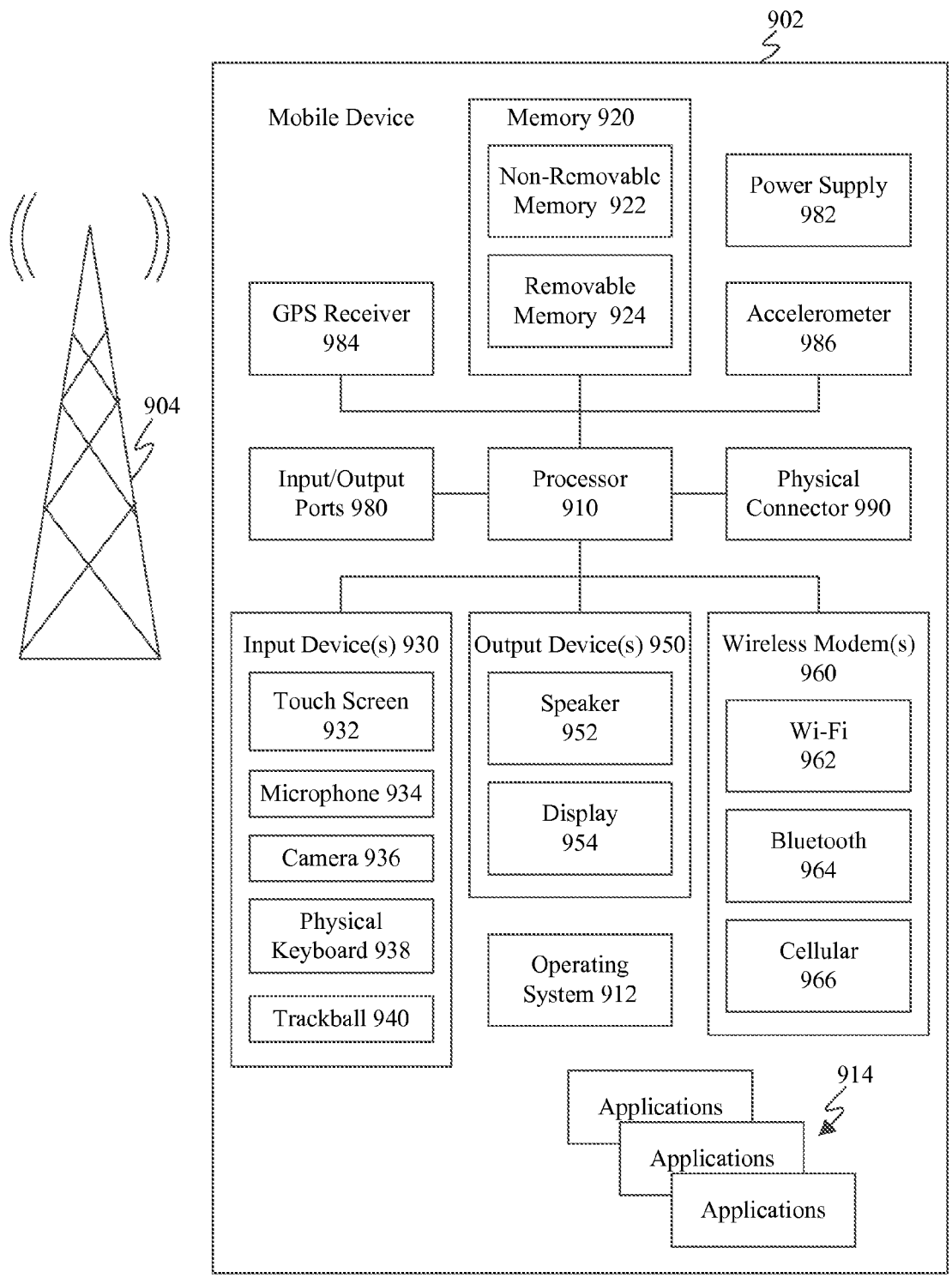
FIG. 9 is a block diagram of an example mobile device that may be used to implement various embodiments.

FIG. 9 is a block diagram of an exemplary mobile device 902 that may implement embodiments described herein. As shown in FIG. 9, mobile device 902 includes a variety of optional hardware and software components. Any component in mobile device 902 can communicate with any other component, although not all connections are shown for ease of illustration. Mobile device 902 can be any of a variety of computing devices (e.g., cell phone, smartphone, handheld computer, Personal Digital Assistant (PDA), etc.) and can allow wireless two-way communications with one or more mobile communications networks 904, such as a cellular or satellite network, or with a local area or wide area network.

The illustrated mobile device 902 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components of mobile device 902 and provide support for one or more application programs 914 (also referred to as "applications" or "apps"). Application programs 914 may include common mobile computing applications (e.g., e-mail applications, calendars, contact managers, Web browsers, messaging applications) and any other computing applications (e.g., word processing applications, mapping applications, media player applications).

The illustrated mobile device 902 can include memory 920. Memory 920 can include non-removable memory 922 and/or removable memory 924. Non-removable memory 922 can include RAM, ROM, flash memory, a hard disk, or other well-known memory devices or technologies. Removable memory 924 can include flash memory or a Subscriber Identity Module (SIM) card, which is well known in GSM communication systems, or other well-known memory devices or technologies, such as "smart cards." Memory 920 can be used for storing data and/or code for running operating system 912 and applications 914. Example data can include Web pages, text, images, sound files, video data, or other data to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 902 can support one or more input devices 930, such as a touch screen 932, a microphone 934, a camera 936, a physical keyboard 938 and/or a trackball 940 and one or more output devices 950, such as a speaker 952 and a display 954. Touch screens, such as touch screen 932, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens.

Other possible output devices (not shown) can include piezoelectric or other haptic output devices. Some devices can serve more than one input/output function. For example, touch screen 932 and display 954 can be combined in a single input/output device. The input devices 930 can include a Natural User Interface (NUI).

Wireless modem(s) 960 can be coupled to antenna(s) (not shown) and can support two-way communications between the processor 910 and external devices, as is well understood in the art. The modem(s) 960 are shown generically and can include a cellular modem 966 for communicating with the mobile communication network 904 and/or other radio-based modems (e.g., Bluetooth 964 and/or Wi-Fi 962). At least one of the wireless modem(s) 960 is typically configured for communication with one or more cellular networks, such as a GSM network for data and voice communications within a single cellular network, between cellular networks, or between the mobile device and a public switched telephone network (PSTN).

Mobile device 902 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components of mobile device 902 are not required or all-inclusive, as any components can be deleted and other components can be added as would be recognized by one skilled in the art.

In an embodiment, mobile device 902 is configured to perform any of the functions of user computing device 102 (including the functions of digital personal assistant 112) as described above in reference to FIG. 1 or any of the functions of user computing device 700 (including the functions of digital personal assistant 712 and user profile system 706) as described above in reference to FIG. 7. Computer program logic for performing the functions of user computing device 102 or user computing device 702 may be stored in memory 920 and executed by processor 910. By executing such computer program logic, processor 910 may be caused to implement any of the features of any of the components of user computing device 102 or user computing device 700. Also, by executing such computer program logic, processor 910 may be caused to perform any or all of the steps of any or all of the flowcharts depicted in FIGS. 2-6.

V. Example Computer System Implementation

Figure 10:
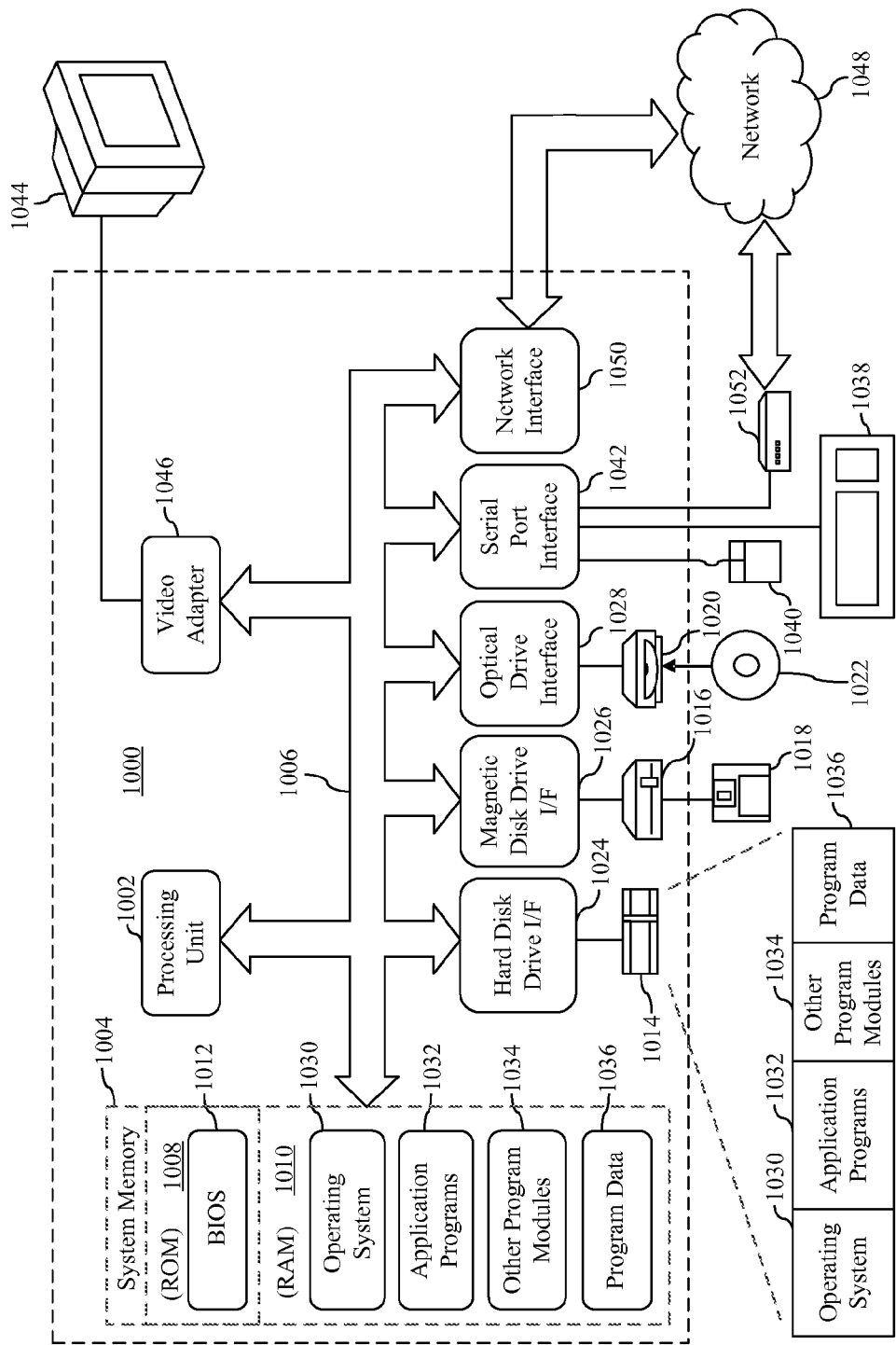
FIG. 10 is a block diagram of an example processor-based computer system that may be used to implement various embodiments.

FIG. 10 depicts an example processor-based computer system 1000 that may be used to implement various embodiments described herein. For example, system 1000 may be used to implement various components of system 100 as described above in reference to FIG. 1 (e.g., user computing device 102 and/or user profile system 106) or user computing device 700 as described above in reference to FIG. 7. System 1000 may also be used to implement any or all of the steps of any or all of the flowcharts depicted in FIGS. 2-6. The description of system 1000 provided herein is provided for purposes of illustration, and is not intended to be limiting. Embodiments may be implemented in further types of computer systems, as would be known to persons skilled in the relevant art(s).

As shown in FIG. 10, system 1000 includes a processing unit 1002, a system memory 1004, and a bus 1006 that couples various system components including system memory 1004 to processing unit 1002. Processing unit 1002 may comprise one or more microprocessors or microprocessor cores. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

System 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, BLU-RAY™ disk or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1030, one or more application programs 1032, other program modules 1034, and program data 1036. In accordance with various embodiments, the program modules may include computer program logic that is executable by processing unit 1002 to perform any or all of the functions and features of user computing device 102 or user profile system 106 as described above in reference to FIG. 1 or of user computing device 700 as described above in reference to FIG. 7. The program modules may also include computer program logic that, when executed by processing unit 1002, performs any of the steps or operations shown or described in reference to the flowcharts of FIGS. 2-6.

A user may enter commands and information into system 1000 through input devices such as a keyboard 1038 and a pointing device 1040. Other input devices (not shown) may include a microphone, joystick, game controller, scanner, or the like. In one embodiment, a touch screen is provided in conjunction with a display 1044 to allow a user to provide user input via the application of a touch (as by a finger or stylus for example) to one or more points on the touch screen. These and other input devices are often connected to processing unit 1002 through a serial port interface 1042 that is coupled to bus 1006, but may be connected by other interfaces, such as a parallel port, game port, or a universal serial bus (USB). Such interfaces may be wired or wireless interfaces.

A display 1044 is also connected to bus 1006 via an interface, such as a video adapter 1046. In addition to display 1044, system 1000 may include other peripheral output devices (not shown) such as speakers and printers.

System 1000 is connected to a network 1048 (e.g., a local area network or wide area network such as the Internet) through a network interface or adapter 1050, a modem 1052, or other suitable means for establishing communications over the network. Modem 1052, which may be internal or external, is connected to bus 1006 via serial port interface 1042.

As used herein, the terms "computer program medium," "computer-readable medium," and "computer-readable storage medium" are used to generally refer to memory devices or storage structures such as the hard disk associated with hard disk drive 1014, removable magnetic disk 1018, removable optical disk 1022, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050, serial port interface 1042, or any other interface type. Such computer programs, when executed or loaded by an application, enable system 1000 to implement features of embodiments of the present invention discussed herein. Accordingly, such computer programs represent controllers of the system 1000.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1000 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

VI. CONCLUSION

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method implemented by one or more computing devices, comprising:
    inferring an item of information about a user based on at least one observed activity thereof;
    determining a sensitivity level that has been assigned to the item of information, the sensitivity level being specified in accordance with a scaling or grading system used to represent different sensitivity levels;
    determining a current stage of relationship that indicates a particular degree of trust between the user and a system, device or service;
    determining that the sensitivity level assigned to the item of information is compatible with the current stage of relationship; and
    in response to at least determining that the sensitivity level assigned to the item of information is compatible with the current stage of relationship, causing a means by which the user can provide input about the item of information to be presented to the user.

2. The method of claim 1, further comprising:
    determining that the user has indicated that the item of information is true; and
    in response to determining that the user has confirmed that the item of information is true, adding the item of information to a user profile that is accessible to the user.

3. The method of claim 1, further comprising:
    determining that the user has indicated that the item of information is true or not true; and
    adjusting the confidence level associated with the item of information based on the indication provided by the user.

4. The method of claim 1, wherein inferring the item of information is performed based on at least one interaction between the user and a digital personal assistant.

5. The method of claim 1, wherein the presenting comprises presenting via a user interface of a digital personal assistant the means by which the user can provide input about the item of information.

6. The method of claim 1, wherein presenting via the user interface the means by which the user can provide input about the item of information comprises performing one or more of:
    presenting a question concerning the truthfulness of the item of information to which the user can answer yes or no;
    presenting a question and multiple user-selectable answers corresponding thereto, wherein only one of the answers corresponds to the item of information; and
    presenting an indication of a benefit that will accrue to the user from confirming whether or not the item of information is true.

7. The method of claim 1, further comprising selecting the means by which the user can provide input about the item of information from among a plurality of different means by which the user can provide input about the item of information, wherein the selecting is performed based at least on one or more of the sensitivity level assigned to the item of information and the current stage of relationship.

8. The method of claim 1, wherein determining the current stage of relationship that indicates a particular degree of trust between the user and a system, device or service comprises determining the current stage of relationship based on one or more of:
    passage of time;
    frequency or amount of interaction by the user with the system, device or service;
    an amount of user profile information that has been confirmed by the user; and
    a nature of information that has been voluntarily provided or confirmed by the user.

9. The method of claim 1, wherein determining whether the sensitivity level assigned to the item of information is compatible with the current stage of relationship comprises comparing the sensitivity level assigned to the item of information to a current stage of relationship for a particular topical domain.

10. A system comprising:
    one or more processors; and
    one or more memory devices accessible to the one or more processors, the one or more memory devices storing components for execution by the one or more processors, the components including:
        an inference building component operable to infer an item of information about a user based on at least one observed activity thereof, to assign a confidence level to the item of information and to determine a sensitivity level that has been assigned to the item of information, the sensitivity level being specified in accordance with a scaling or grading system used to represent different sensitivity levels; and
        a user confirmation component operable to determine that the confidence level associated with the item of information meets or exceeds a threshold, determine that the sensitivity level assigned to the item of information is compatible with a current stage of relationship that indicates a particular degree of trust between the user and a system, device or service, and in response to at least determining that the confidence level associated with the item of information meets or exceeds the threshold and that the sensitivity level assigned to the item of information is compatible with the current stage of relationship, to cause a means by which the user can provide input about the item of information to be presented to the user.

11. The system of claim 10, wherein the user confirmation component is further operable to determine that the user has indicated that the item of information is true and, in response to determining that the user has indicated that the item of information is true, add the item of information to a user profile that is accessible to the user.

12. The system of claim 10, wherein the user confirmation component is further operable to determine that the user has indicated that the item of information is true or not true and to adjust the confidence level associated with the item of information based on the indication provided by the user.

13. The system of claim 10, wherein the inference building component is operable to determine the confidence level associated with the item of information based on one or more confidence levels respectively associated with one or more categorically-related or hierarchically-related items of information.

14. The system of claim 10, wherein the inference building component is operable to infer the item of information based on at least one interaction between the user and a digital personal assistant.

15. The system of claim 10, wherein the user confirmation component is operable to cause the means by which the user can provide input about the item of information to be presented to the user via a user interface of a digital personal assistant.

16. The system of claim 10, wherein the means by which the user can provide input about the item of information includes one or more of:
   a question concerning the truthfulness of the item of information to which the user can answer yes or no;
   a question and multiple user-selectable answers corresponding thereto, wherein only one of the answers corresponds to the item of information; and
   an indication of a benefit that will accrue to the user from confirming whether or not the item of information is true.

17. The system of claim 10, wherein the user confirmation component is further operable to select the means by which the user can provide input about the item of information from among a plurality of different means by which the user can provide input about the item of information, wherein the selecting is performed based at least on the confidence level associated with the item of information.

18. A computer program product comprising a computer-readable memory having computer program logic recorded thereon that when executed by at least one processor causes the at least one processor to perform operations, the operations comprising:
   inferring an item of information about a user based on at least one observed activity thereof;
   determining a confidence level associated with the item of information and a sensitivity level that has been assigned to the item of information, the sensitivity level being specified in accordance with a scaling or grading system used to represent different sensitivity levels;
   determining that the confidence level associated with the item of information meets or exceeds a threshold and that the sensitivity level assigned to the item of information is compatible with a current stage of relationship that indicates a particular degree of trust between the user and a system, device or service; and
   in response to at least determining that the confidence level associated with the item of information meets or exceeds the threshold and that the sensitivity level assigned to the item of information is compatible with the current stage of relationship, presenting to the user via a user interface a means by which the user can provide input about the item of information.

19. The computer program product of claim 18, wherein the operations further comprise:
   determining that the user has indicated that the item of information is true; and
   in response to determining that the user has indicated that the item of information is true, adding the item of information to a user profile that is accessible to the user.

20. The computer program product of claim 18, wherein the operations further comprise:
   determining that the user has indicated that the item of information is true or not true; and
   adjusting the confidence level associated with the item of information based on the indication provided by the user.

* * * * *